(12) United States Patent
Creighton, III

(10) Patent No.: US 6,308,428 B1
(45) Date of Patent: Oct. 30, 2001

(54) LASER ALIGNMENT SYSTEM

(75) Inventor: Albert M. Creighton, III, Newburyport, MA (US)

(73) Assignee: Pinpoint Laser Systems, Newburport, MA (US)

( * ) Notice: Subject to any disclaimer, the term of this patent is extended or adjusted under 35 U.S.C. 154(b) by 0 days.

(21) Appl. No.: 09/219,332

(22) Filed: Dec. 22, 1998

(51) Int. Cl.⁷ ............................................. G01C 15/00
(52) U.S. Cl. .......................... 33/286; 33/533; 33/645; 33/DIG. 21
(58) Field of Search ............................. 33/286, 533, 645, 33/DIG. 21

(56) References Cited

U.S. PATENT DOCUMENTS

| | | | |
|---|---|---|---|
| 1,602,698 | * 10/1926 | Nielsen | 33/286 |
| 3,600,987 | 8/1971 | Kvasnicka . | |
| 3,603,688 | * 9/1971 | Smith-Vaniz | 356/400 |
| 3,723,013 | 3/1973 | Stirland et al. | 356/152 |
| 3,778,169 | * 12/1973 | Adams | 356/399 |
| 3,799,674 | 3/1974 | Guillet et al. | 356/138 |
| 3,826,576 | 7/1974 | Stewart | 366/164 |
| 3,865,492 | 2/1975 | Butler | 356/155 |
| 3,923,402 | 12/1975 | Turcotte | 356/152 |
| 4,022,533 | 5/1977 | Firester | 356/153 |
| 4,411,500 | * 10/1983 | Yonezawa et al. | 359/732 |
| 4,417,816 | * 11/1983 | Kindl et al. | 356/357 |
| 4,674,870 | * 6/1987 | Cain et al. | 356/4.08 |
| 4,751,782 | * 6/1988 | Ammann | 33/291 |
| 4,852,265 | * 8/1989 | Rando et al. | 33/227 |
| 4,907,881 | 3/1990 | Jones | 356/152 |
| 5,077,905 | * 1/1992 | Murray et al. | 33/412 |
| 5,144,487 | 9/1992 | Hersey | 359/629 |
| 5,233,761 | 8/1993 | Guaraldi et al. | 33/655 |
| 5,367,779 | * 11/1994 | Lee | 33/290 |
| 5,402,226 | * 3/1995 | Matthews et al. | 356/141.3 |
| 5,440,112 | 8/1995 | Sakimura et al. | 250/203.1 |
| 5,486,690 | * 1/1996 | Ake | 250/206.1 |
| 5,507,097 | 4/1996 | Duey et al. | 33/286 |
| 5,617,645 | * 4/1997 | Wick et al. | 33/551 |
| 5,621,531 | 4/1997 | Van Andel et al. | 356/399 |
| 5,798,828 | * 8/1998 | Thomas et al. | 356/141.3 |
| 6,009,630 | * 1/2000 | Rando | 33/365 |

FOREIGN PATENT DOCUMENTS

| | | | |
|---|---|---|---|
| 0452975 | * 10/1991 | (EP) | 33/286 |
| 774403 | * 5/1957 | (GB) | 33/46 |
| 0090519 | * 4/1987 | (JP) | 374/121 |

* cited by examiner

*Primary Examiner*—Diego Gutierrez
*Assistant Examiner*—Lydia M. De Jesús
(74) *Attorney, Agent, or Firm*—George A. Herbster

(57) ABSTRACT

An alignment system includes a laser transmitter and receiver. The receiver includes a linear photodetector array centered at a predetermined location with respect to machined surfaces that define a receiver reference plane. An indicator on the receiver displays a deviation of the position of the laser beam from a predetermined location on the photodetector array thereby to quantify any misalignment of a surface supporting the receiver with respect to the transmitted laser beam.

18 Claims, 6 Drawing Sheets

LASER ALIGNMENT SYSTEM

BACKGROUND OF THE INVENTION

1. Field of the Invention

This invention generally relates to apparatus for aligning objects and more particularly to a portable system utilizing a laser for enabling an operator to quantify alignment and misalignments precisely.

2. Description of Related Art

There are a number of applications where it is important to obtain precise alignment between two elements or among three or more elements and particularly to quantify any misalignments that may exist. Examples in which such alignments are beneficial include aligning two or more machine elements, such as machine beds or shafts to a common plane or axis. Another example includes measuring surface flatness to ascertain any variance of a surface from a common plane.

The need for such alignment applications has led to the development of different apparatus specifically designed for an application. U.S. Letters Pat. No. 3,603,688 (1971) to Smith-Vaniz depicts an alignment apparatus with a laser light source and a remote target object. The target object includes an array of photocells for sensing and indicating the displacement of a centroid of an impinging laser beam from a reference point in the array. The laser light source establishes a beam pattern of contrasting light intensity indicative of the centroid of the beam. The target photocell array is designed to maximize sensitivity. The annunciation of any misalignment is in the form of two meters that indicate displacement in x and y directions. The alignment apparatus is used by directing a laser beam along a projection axis and then moving the object until the meters null. There appears to be no provision in such a system for providing surface flatness or other similar measurements or for providing a direct reading of the amount of any misalignment by numeric display.

U.S. Letters Pat. No. 3,723,013 (1973) to Stirland et al. discloses an alignment system that utilizes intermediate photodetectors with central apertures and a terminal photodetector. Each photodetector has four quadrants of active area. The centers are aligned on an axis of a laser beam. Output signals are utilized to indicate alignment or the degree of misalignment of the centers with respect to the axis of the laser beam. Such a system seems to require multiple detectors that can become costly to implement.

U.S. Letters Pat. No. 3,826,576 (1974) to Stewart discloses an alignment system in which a laser beam passes through a lens assembly to create a focusable diverging planar light beam that is projected tangentially to an object surface and onto a screen rearwardly of the object. Any increase in the size of the object into the beam interrupts the beam image on the screen. While such a system does provide some indication of surface flatness, it appears it will only detect extensions of the surface into the beam. Areas of reduced dimension would seem to go undetected. Moreover, this system does not appear to quantify any misalignment.

U.S. Letters Pat. No. 5,233,761 (1993) to Guaraldi et al. discloses a method for aligning multiple machine units by positioning precisely located, cylindrical alignment markers in the various elements to be aligned. A laser beam can then be directed along a desired line and through axial bores in the markers. The various machine elements are positioned until the laser beam passes through all alignment markers. Alternatively, when end surfaces of the alignment markers lie in a common plane, the laser beam can be directed through radial bores found in the markers. Nothing in this patent discloses any quantification of misalignment.

U.S. Letters Pat. No. 5,507,097 (1996) to Duey et al. discloses an apparatus for inspecting machine tie bars. A laser is mounted to project a laser beam normally to a support and parallel to the desired axis of a tie bar. A receiver in the form of a photocell target mounts on the tie bar and generates voltages that are processed in a separate control unit and computer to provide angular and lateral deviations of the laser beam from the axis of the target thereby to indicate tie bar straightness and squareness.

Each of the foregoing references appears limited to a specific application. For example, the Smith-Vaniz patent seems directed primarily to moving an object to a particular location, but does not seem readily adapted to measure surface flatness. Moreover, such alignment systems generally require a trained operator. Given the single-purpose designs and requirements for training and the expense of such systems, many companies can not afford to purchase such equipment and employ such individuals on a full-time basis. Consequently, they employ a subcontractor to perform alignments. The use of subcontractors oftentimes introduces scheduling problems and intolerable delays which further increases the costs of the alignment procedure.

SUMMARY

Therefore it is an object of this invention to provide an alignment system that is adapted for providing precise alignment in a wide variety of applications.

Another object of this invention is to provide an alignment system that is portable and easy to use and that provides precise alignment information in a variety of applications.

Yet another object of this invention is to provide an alignment system that is adapted to provide precise alignment information in a variety of applications and that is inexpensive to produce.

In accordance with this invention an alignment system includes a transmitter and a receiver. The transmitter projects a laser beam along a projection axis. The receiver includes a housing that defines a receiver reference plane. A detector has a predetermined location within the housing relative to the receiver reference plane and detects the presence of the laser beam from the transmitter when the receiver is in nominal alignment with the transmitter. A display provides quantitative information concerning any misalignment based upon the position of the laser beam relative to the known location and reference plane of the receiver.

In accordance with another aspect of this invention, a receiver is provided for use in an alignment process by which a distance from a laser beam is determined. The receiver includes a housing that defines a receiver reference plane. A linear photodetector array has a predetermined location in the housing relative the receiver reference plane and detects the presence of the laser beam. The linear photodetector array generates first and second signals representing the positions of the center of the laser beam relative to the opposite ends of the linear array respectively. Sum and difference signals are generated based upon the first and second signals. The quotient of the difference divided by the sum then is displayed in a quantitative manner to provide a numeric measurement of the position of the reference plane relative to the laser beam.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
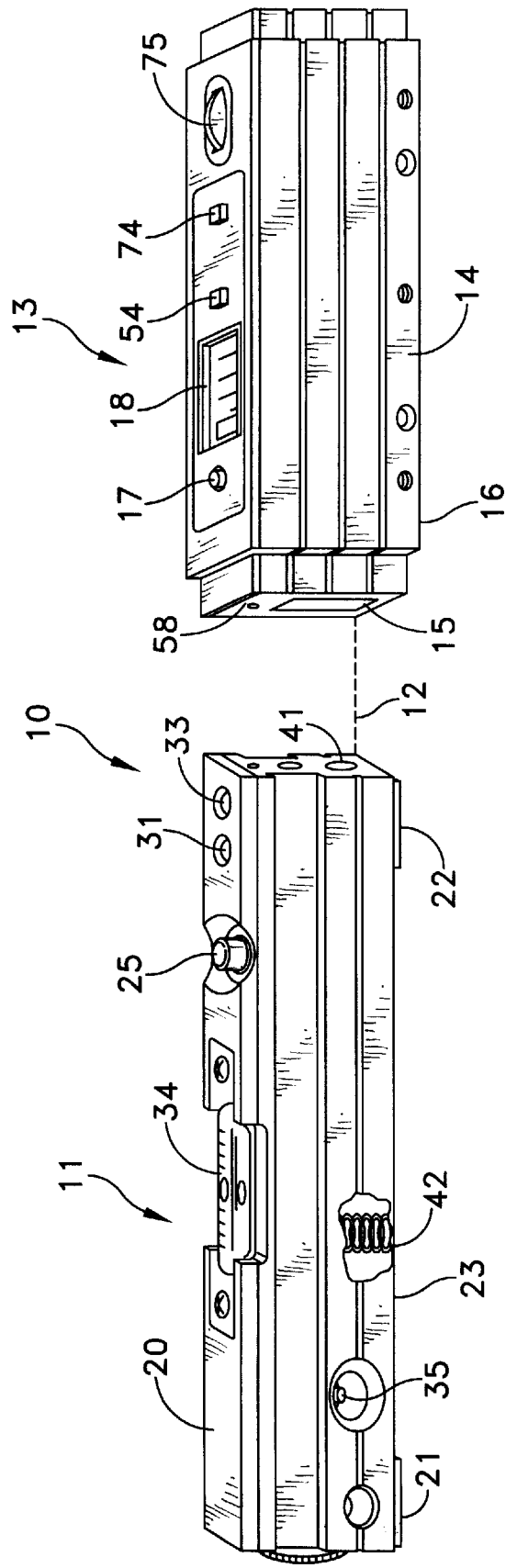
FIG. 1 depicts a transmitter and receiver that constitute an alignment system constructed in accordance with this invention.

FIG. 1 depicts an alignment system 10 constructed in accordance with this invention. The system 10 includes a transmitter 11 that projects a laser beam 12 along a projection axis. A receiver 13 is positioned to intercept the laser beam and includes a housing 14 with a detector window 15. A bottom portion 16 formed with flat machined edges or surfaces. These edges or surfaces define a receiver reference plane that is oriented horizontally in FIG. 1.

When the receiver 13 is energized, the laser beam strikes an internal detector described later. When the laser beam is in a prescribed range of locations on the detector, a light 17 indicates that receipt by changing to a green color. At that point a visual annunciator in the form of a multiple numeric character display 18 provides a reading of the deviation of the reference plane from the laser beam 12, as will now be described in more detail.

Figure 2:
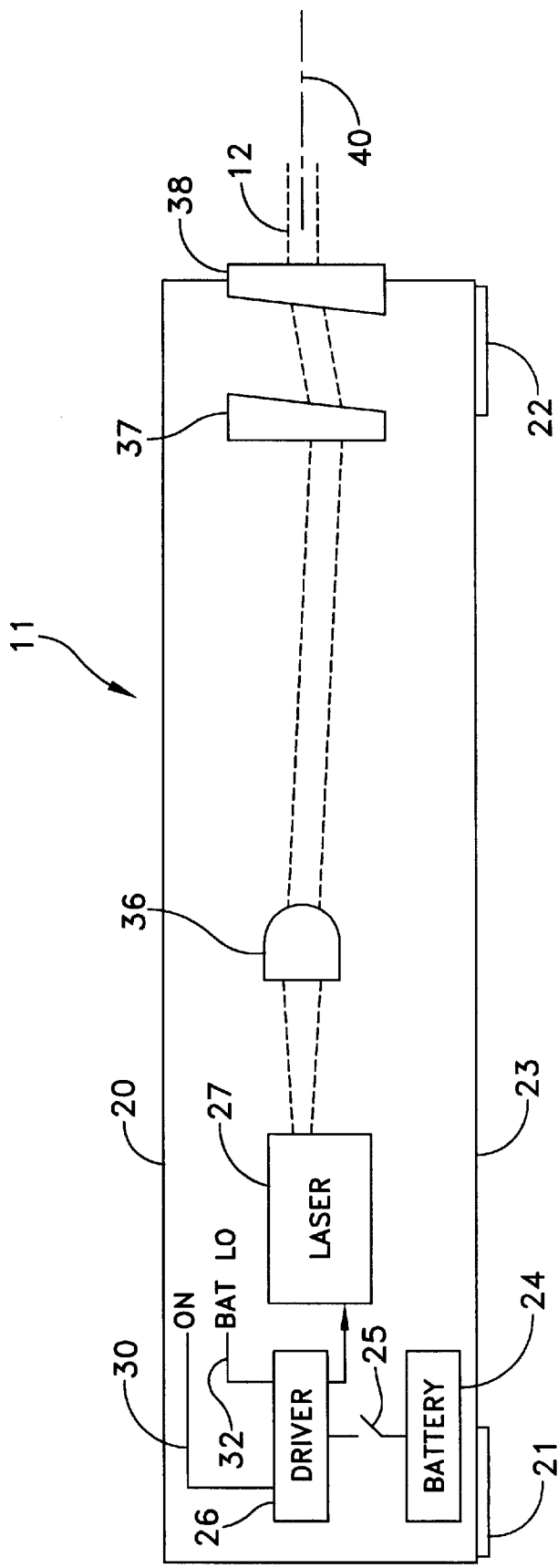
FIG. 2 is a diagram that depicts certain elements of a transmitter of FIG. 1.

FIGS. 1 and 2 depict the transmitter 11 as including a housing 20. In this particular embodiment machined surfaces 21 and 22 at either end of the bottom of the housing 20 lie in a plane that constitutes a transmitter reference plane that will correspond precisely to the plane of a support surface.

Referring specifically to FIG. 2, a battery 24 inside the housing constitutes a power supply for the transmitter so the transmitter 11 is a portable self-contained unit. When an on/off switch, shown as a pushbutton switch 25 in FIGS. 1 and 2, closes, the battery 24 energizes a laser driver circuit 26. The driver circuit may include conventional circuits generating an ON signal on a conductor 30 in FIG. 2 that energizes a light-emitting diode (i.e., an LED) 31 in FIG. 1 or other visual indicator. A BAT LO signal on a conductor 32 indicates that the battery voltage is falling below an appropriate level. The BAT LO signal energizes an LED 33 or other visual indicator. In one particular embodiment, the visual indicator 31 is a green LED; and the visual indicator 33, a red LED.

As more clearly shown in FIG. 1, the housing 20 also includes a horizontal plumb vial 34 and a vertical plumb vial 35. These conventional vials facilitate leveling of the transmitter 11 in a horizontal direction using the vial 34 or a vertical direction using the vial 35.

Referring again to FIG. 2, when the driver 26 energizes the laser 27, it generates a diverging laser beam having a non-circular shape. A plano-convex lens 36 focusses the diverging laser beam into a parallel beam with a substantially circular cross section. The parallel beam then passes through two wedge plates 37 and 38 to be directed along an a projection axis 40. In this embodiment, the wedge plate 38 in FIG. 2 also acts as an optical window 41 in FIG. 1.

As known wedge plates can be positioned to effect small changes in angle or slight beam displacements. During manufacture the wedge plates 37 and 38 are rotated so that the projection axis 40 is parallel to the reference plane defined by the machined surfaces 21 and 22 and to the sides of the housing 20. Thus, the optical system shown in FIG. 2 serves to convey the beam from the laser 27 through the wedge plate 38 as a circular beam parallel to the transmitter reference plane and the sides of the housing 20.

Although the transmitter 11 as shown in FIGS. 1 and 2 can be used in the configuration as shown, the preferred embodiment of the transmitter also includes a threaded female fitting 42 formed vertically through the bottom surface 23 of the transmitter 11. This enables accessories to be clamped to the bottom surface of the transmitter 11. One such accessory, for example, is a flat bar that elevates the transmitter 11 so that the optical axis 40 is positioned exactly at the center of the detector in the receiver 13. Tripods, leveling brackets and other devices can also be attached to support the transmitter 11.

As previously indicated, the receiver 13 in FIG. 1 intercepts the laser beam and indicates the relative position of that beam to the reference plane defined by the machined surfaces 16. As shown generally in FIG. 3, the laser beam 12 enters the housing 14 of the receiver 13 through the optical window 15 to strike a linear photodetector array 50 at a position displaced inside the housing 14 from the window 15. The photodetector array 50 is positioned so its center 51 is at a position known precisely with respect to the machined surface 16. A battery 52 energizes a readout circuit 53 that energizes the linear photodetector array and receives signals from it for display on the numeric display 18.

Figure 4:
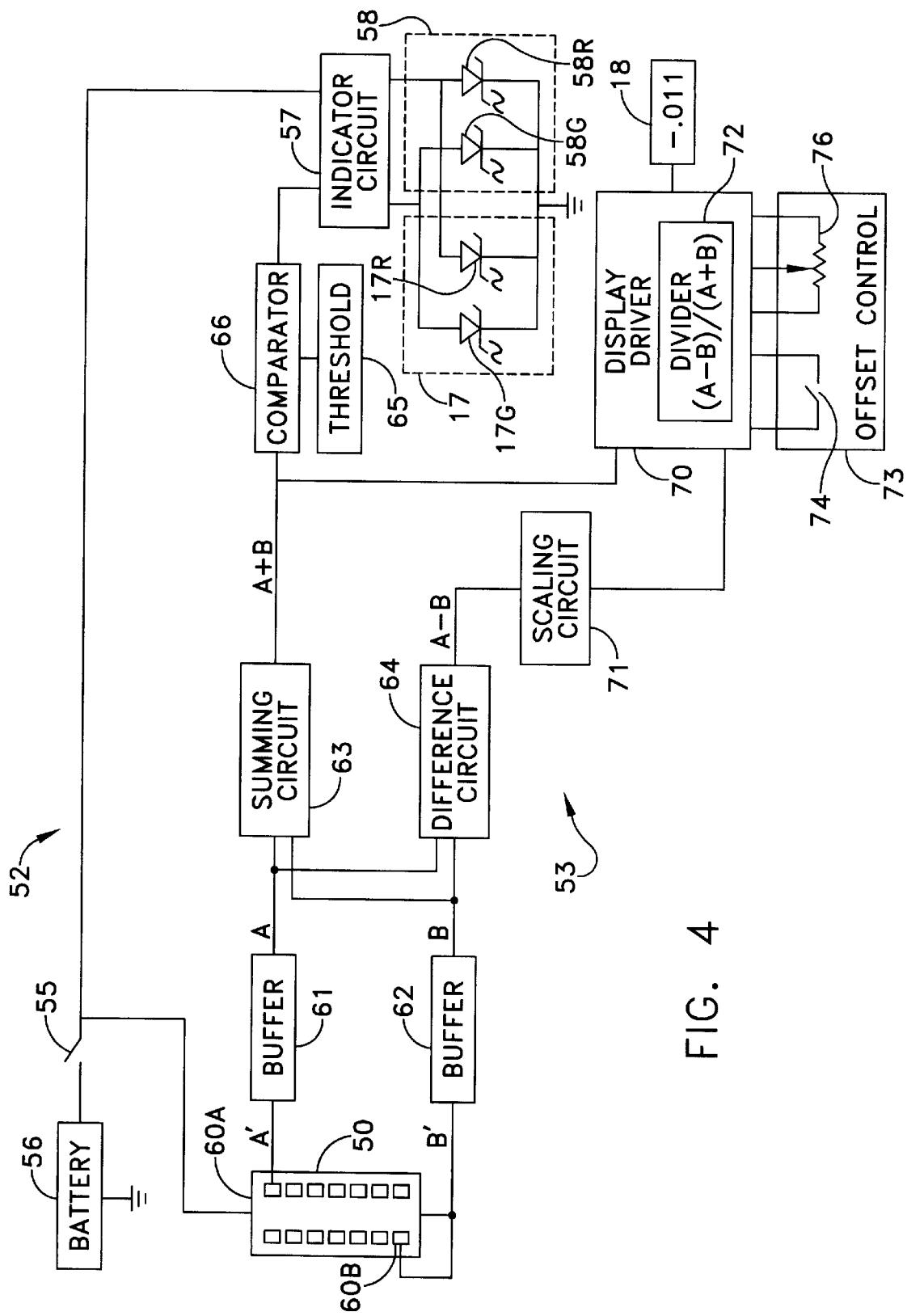
FIG. 4 is a schematic of the circuitry in a readout circuit of FIG. 3.

Referring now to FIG. 1, when an operator actuates a pushbutton switch 54 on the receiver 13, a switch 55 in FIG. 4 closes so a battery 56 energizes an indicator circuit 57. The indicator circuit 57 controls the READY light 17 and a second READY light 58 on the face of the receiver above the window 15. Including the two indicators 17 and 58 facilitates the use of the device. For example, if an operator is manipulating the receiver, the indicator 17 is generally readily visible. If the operator is manipulating the transmitter 11 which is at some distance from the receiver 13, the individual will be able to monitor any change in the color of the indicator 58.

Each of the indicators comprises a bicolor LED represented by light emitting diodes 17G and 58G for producing green light and light emitting diodes 17R and 58R for producing red light. Assuming that the laser beam does not strike the photodetector array 50, the indicator circuit energizes the light emitting diodes 17R and 58R to display a red light indicating that the reading at the numeric display 18 is not valid.

When the transmitter 11 is energized and the laser beam 12 reaches the linear photodetector array 50, two signals are produced at terminals 60A and 60B. There are designated A' and B' signals. In this particular embodiment the A' signal is selected to vary as a function of the position of the laser beam vertically on the array 50 relative to a detector element 60A. Similarly, the B' signal represents the position of the laser beam 12 on the array 50 relative to a detector element 60B.

The magnitude of the A' and B' signals is dependent upon the intensity of the beam striking all the anodes in one section of the array and the vertical location of the beam. As known, this is achieved by summing the signals from each detector anode weighted by the distance of the specific anode from a reference end of the array column. As shown in FIG. 4, the terminals 60A and 60B represent diagonally opposite ends of the two columns of detectors in the linear array 50. If the laser beam strikes the photodetector array near the top, the A' signal will be a maximum and the B' signal a minimum. As the beam traverses downwardly in FIG. 4 the magnitude of the A' signal decreases to a minimum while the magnitude of the B' signal increases to a maximum. In accordance with this invention it is these two signals that provide the precise quantitative information on the visual indicator 18.

Conventional buffers 61 and 62, each with a capacitive feedback, smooth and time average the A' and B' signals to provide A and B signals, respectively. A summing circuit 63 generates an "A+B" signal having a value corresponding to the sum of the two signals; a difference circuit 64 produces an "A−B" signal having a value corresponding to the difference between the two signals.

The "A+B" signal then represents the total energy in the photodetector 50. The "A−B" signal will have a zero value when the laser beam is centered on the photodetector array 50. it will increase positively as the beam moves up from the center and negatively as the beam moves down from the center.

A threshold circuit 65 establishes a threshold level against which a comparator 66 monitors the "A+B" signal from the summing circuit 63. When the threshold is reached, indicating that the intensity of the beam on the photodetector reaches a sufficient level to provide accurate results, the comparator 66 generates an enabling signal that causes the indicator circuit 57 to extinguish the LEDs 17R and 58R and switch on the LEDs 17G and 58G thereby announcing that the receiver is receiving a laser beam and providing accurate readings.

The output from the summing circuit 63 is also applied to one input of a display driver 70. A scaling circuit 71 couples the difference signal to another input of the display driver 70. The scaling circuit includes a conventional variable gain amplifier to normalize the difference signal to a value that will produce a zero readout on the indicator 18 when the receiver is exactly aligned with the incoming laser beam projection axis. This is a one time factory setting.

The display driver 70 includes a divider circuit 72 that is a conventional component of such display drivers. The output from the divider circuit 72 represents the quotient obtained by dividing the scaled "A−B" signal, as a numerator, by the "A+B" signal, as a denominator. Generating this quotient signal eliminates any variation in the readout 18 due to changes in energy as might occur, for example, if reading were taken with the receiver 13 skewed slightly with respect to the transmitter 11.

Figure 3:
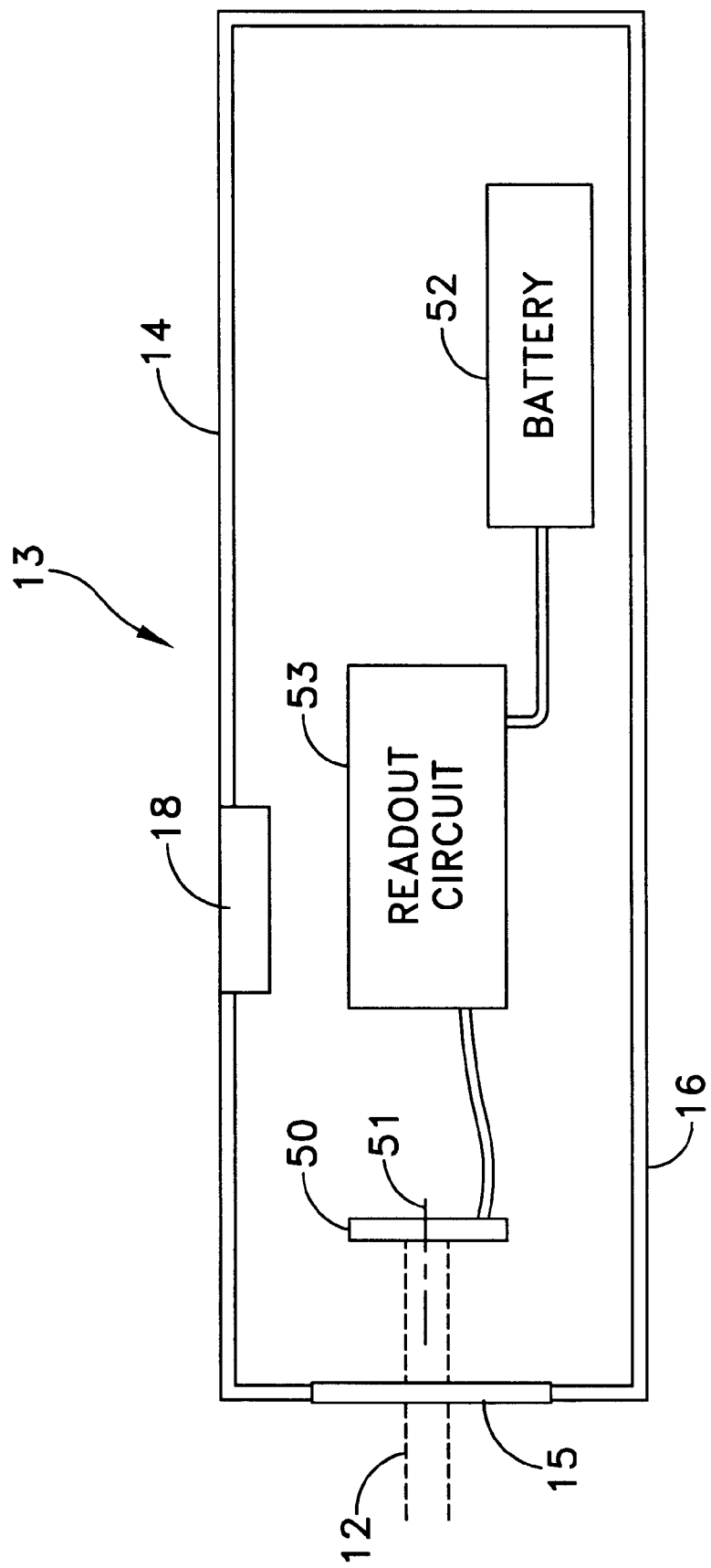
FIG. 3 is a diagram that depicts components of the receiver of FIG. 1.

Thus, if the receiver 13 in FIG. 1 is positioned so that the projection axis 40 shown in FIG. 2 is coaxial with the array axis 51 in FIG. 3, the A and B signals will be equal and the visual indicator will display a zero value, e.g., "0.000". However, if the receiver moves the array axis 51 from the projection axis 40, the indicator 18 will provide an output that indicates that displacement. This circuit provides such displacement with a resolution of 0.001" inches.

Some times it is desirable to place the transmitter and receiver at a position in which a known displacement exists even when objects are aligned. In other situations it may be desirable to provide readings relative to some arbitrary number. An optional offset control 73 in FIG. 4 provides that function. When a pushbutton 74 in FIGS. 1 and 4 closes, it energizes the offset control 73. The offset control then applies a voltage to be combined with the scaled difference voltage from the scaling circuit 71 to provide an appropriate offset. The operator controls the amount of offset by means of a thumb wheel switch 75 that controls a potentiometer 76 shown in FIG. 4 and the magnitude of the offset voltage. Thus for example, if the indicator at a reference position on a surface to be measured for flatness indicated "−0.011" as shown by the indicator 18 in FIG. 4, the offset control 73 can be energized and the thumb wheel switch 74 moves until that indication moves to "−0.010","0.000" or other convenient value. Thereafter that offset value and signal would be constant.

Figure 5:
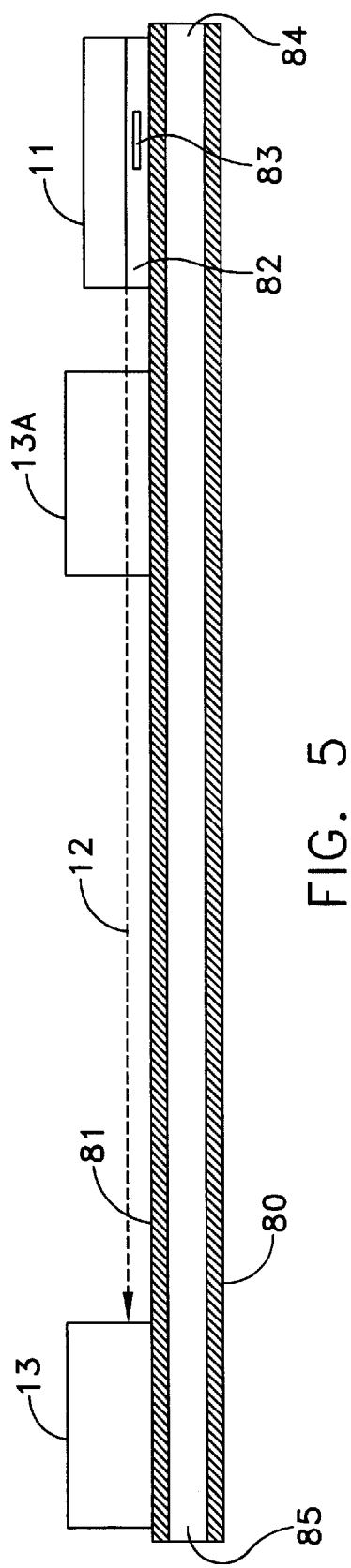
FIG. 5 depicts one application of the apparatus shown in FIG. 1.
Figure 6:
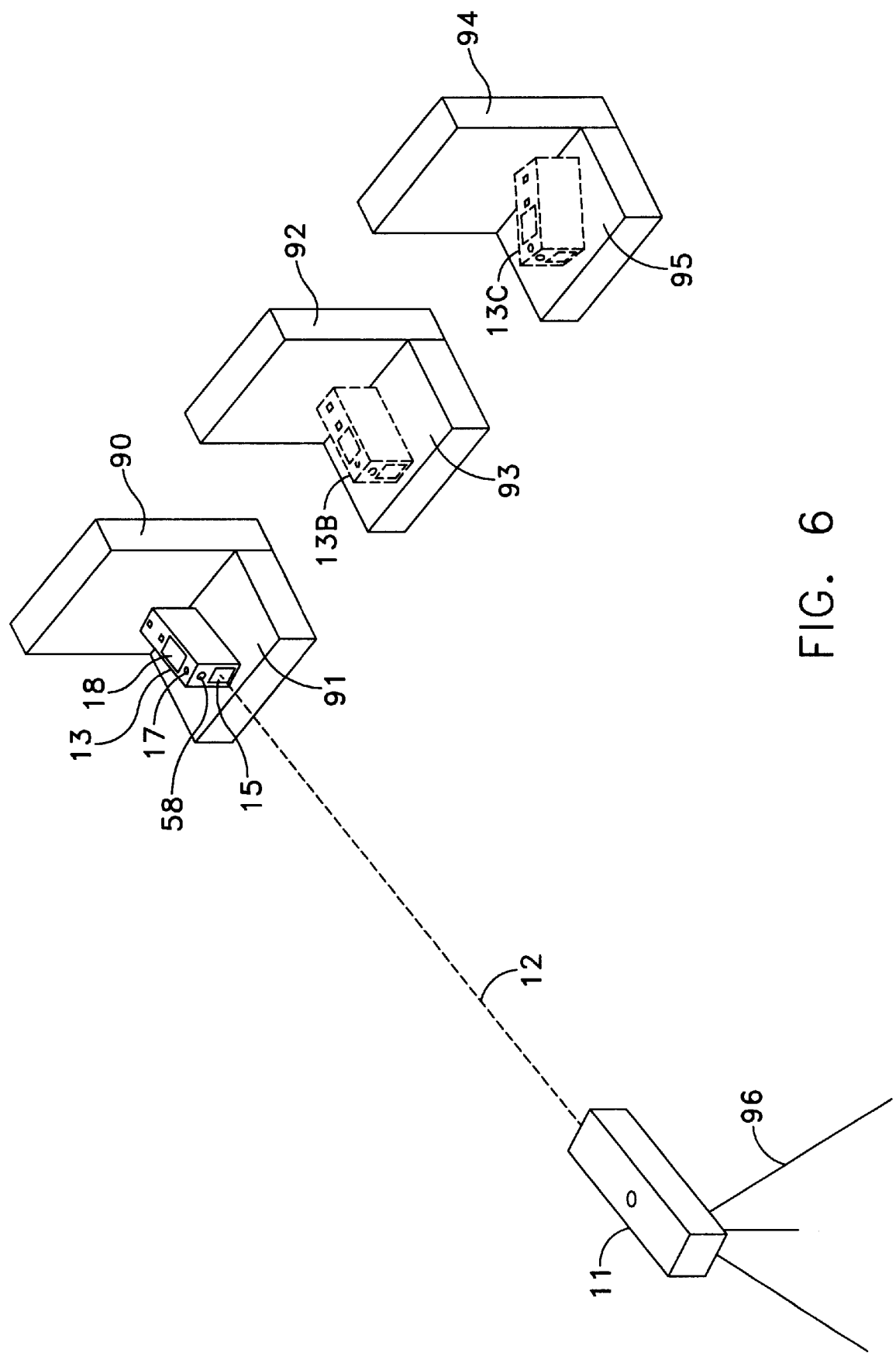
FIG. 6 depicts another application of the apparatus shown in FIG. 1.

FIGS. 5 and 6 depict the flexibility of an alignment system composed of the self-contained, battery operated, portable transmitter 11 and self-contained, portable receiver 13. FIG. 5 demonstrates the procedure for determining any bend in an I beam 80 using a top surface 81 as a measurement surface. A transmitter 11 mounted with a spacer bar 82 locked in position with a thumb wheel screw 83 is located at an end 84 with the I beam 80. The spacer bar 82 elevates the transmitter 11 so the laser beam 12 intercepts the detector at its center line in the receiver 13. With this spacer in place, if the transmitter 11 and receiver 13 are in the same reference plane, the numerical indicator will display a "0.000" value.

Next the receiver 13 is placed at the other end 85 of the beam and properly aligned with the laser beam 12. If the beam 80 is flat, the receiver 13 will display a "0.000" value. If the beam 80 is not flat, the displayed value will accurately indicate the offset.

Next the receiver is placed at an intermediate location as designated by reference 13A. The receiver is aligned with a laser beam 12 and a reading is taken and recorded according to its position. The receiver moves to other intermediate positions for corresponding readings. If those readings are plotted against the line drawn between the transmitter 11 and the laser beam interception of the receiver 13, any bend or other irregularities will be apparent and quantified. As will now be evident, the transmitter 11 and remote receiver 13 provide a system that is easy to use and requires minimal training for measuring flatness.

FIG. 6 depicts an application for aligning multiple discrete objects vertically. For purposes of this discussion an object 90 is shown having a reference plane 91. An object 92 spaced from object 90 has a reference plane 93; an object 94 a reference plane 95. It is assumed that the reference surfaces, 91, 93 and 95 should be coplanar. In this particular application such an alignment can be accomplished by mounting the transmitter 11 on a tripod 96 that is leveled so that rotating the transmitter 11 sweeps the laser beam in a horizontal plane. The receiver 13 can then be placed on one of the reference surfaces, such as the reference surface 91, and aimed by eye toward the transmitter 11. This process can be further enhanced if the laser beam is on because the window 15 will reflect a portion of the beam. When the reflecting surface of the window 15 is normal to the axis 12, that reflection will be back along the beam 12 and the reflection will appear at the front face of the transmitter 11. Thus the receiver can be adjusted by viewing the reflection point of the laser beam on the transmitter 11.

When that reflection point closes on the center of the wedge plate 38 in FIG. 2 and assuming that the reference plane 91 is in approximately the correct position, the ready lights 17 and 58 will turn to green thereby indicating that the numeric display 18 is providing an accurate reading. After that reading is taken, the receiver 13 can be moved to the surface 93 as designated by reference 13B and visually aimed toward the tripod 96 and the transmitter 11. Then the transmitter 11 can be rotated until the operator observes the laser beam striking the receiver at position 13B. When the ready light turns green, the numeric display indicates any deviation of the reference plane from the laser beam. This can then be repeated at the object 94 by placing the receiver on the reference surface 95, the receiver in this position be designated by reference 13C. Comparing the individual quantitative readings from each of the three surfaces are coplanar. Moreover, these readings provide measurements for any shims that might be used to achieve a final alignment.

The examples set forth in FIGS. 5 and 6 depict two specific applications for which a transmitter 11 and receiver 13 constructed in accordance with this invention are adapted. As will be apparent, the systems are equally adapted for shaft and pulley alignments and myriad other alignment procedures. Moreover, for special applications it is a simple matter to produce various mounting mechanisms that can attach to the transmitter as shown in FIG. 1 or to comparable fittings in the receiver 13. The receiver is a small, compact, self-contained battery-operated device that provides a numeric display of the position of the receiver relative to a laser beam impinging its detector. As previously indicated, readings from this display are accurate to ±0.001". Thus in accordance with several objects of this invention, the self-contained, portable transmitter and receiver provide an alignment system that is adapted for providing precise alignment in a wide variety of applications without significant operator training. Moreover the system is easy to use because it is portable and because the system provides quantitative alignment information. Moreover the system is relatively inexpensive to manufacture.

This system has further been described with respect to a specific implementation of this invention. For example, FIG. 4 depicts a circuitry utilizing analog signal processing. Digital processing techniques might be applied to some or all of the analog processing disclosed in FIG. 4. Moreover, FIG. 4 depicts specific circuitry for utilizing signals from a specific linear photodetector array. Other arrays could be substituted with appropriate changes to the circuitry.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. An alignment system comprising:
   A) a transmitter for projecting a laser beam along a projection axis; and
   B) a receiver including:
      i) a housing with means for defining a receiver reference plane,
      ii) detector means having a predetermined location in said housing relative to the receiver reference plane for generating an enabling signal which causes a visual indicator on the receiver to announce that the receiver is receiving a laser beam in response to detecting at least a predetermined laser beam intensity on said detector means,
      iii) means responsive to the enabling signal from said detector means for generating a quantitative value as a display of the position of the laser beam projection axis relative to the predetermined location and the reference plane.

2. An alignment system as recited in claim 1 wherein said transmitter includes a laser that generates the laser beam and a housing for supporting said laser, said transmitter housing defining a transmitter reference plane parallel to the projection axis.

3. An alignment system as recited in claim 2 wherein said transmitter reference plane comprises a plurality of spaced, coplanar machined surfaces on said transmitter housing.

4. An alignment system as recited in claim 2 wherein the projection axis is parallel to the transmitter reference plane and said transmitter additionally includes optical means for projecting the laser beam along the projection axis.

5. An alignment system as recited in claim 4 wherein said laser projects a laser beam having a non-circular cross section and said optical means includes first lens means for forming the non-circular cross section laser beam from said laser into a beam with a circular cross section and a second lens means for directing the laser beam from said first lens means along the projection axis.

6. An alignment system as recited in claim 2 wherein the projection axis is fixed relative to said housing and said transmitter housing additionally includes level means for indicating the orientation of the projection axis.

7. An alignment system as recited in claim 6 wherein said level means includes horizontal and vertical levels for indicating the orientation of the projection axis relative to the horizontal and vertical, respectively.

8. An alignment system as recited in claim 6 wherein said housing transmitter additionally includes means for enabling the attachment of accessories to said transmitter.

9. An alignment system as recited in claim 6 wherein said laser is battery operated.

10. An alignment system as recited in claim 2 wherein said receiver housing includes machined surfaces in a plane for defining the receiver reference plane.

11. An alignment system as recited in claim 10 wherein said detector means includes a linear photodetector array mounted in said receiver housing perpendicularly to the receiver reference plane.

12. An alignment system as recited in claim 11 wherein said receiver additionally includes an optical window enabling the laser beam to pass to said photodetector array.

13. An alignment system as recited in claim 11 wherein said linear photodetector array generates first and second signals representing the positions of the center of the laser beam relative to the opposite ends of said linear photodetector array and said display means includes means for displaying the quotient obtained by dividing a difference value corresponding to the difference between the first and second signals by a sum value corresponding to the sum of the first and second signals.

14. An alignment system as recited in claim 13 wherein said display means includes a numeric display for displaying the value of the quotient.

15. An alignment system as recited in claim 13 additionally including means connected to said display means for an offsetting the difference value.

16. An alignment system as recited in claim 13 additionally including means connected to said display means for offsetting the difference signal by a variable amount.

17. An alignment system as recited in claim 13 additionally comprising means connected to said display means for comparing the sum value to a threshold and visual means responsive to said comparing means for indicating whether the sum value exceeds the threshold.

18. An alignment system as recited in claim 13 wherein said display means includes fixed gain means for generating the sum value and variable gain means for generating the difference value, said receiver additionally comprising means for adjusting the gain of said difference value generating means.

* * * * *